United States Patent [19]
Cole et al.

[11] Patent Number: 5,609,313
[45] Date of Patent: Mar. 11, 1997

[54] AIRCRAFT PROPULSIVE POWER UNIT

[75] Inventors: Derek Cole, Bangor; Philip D. Sherry, Larne; Alan J. Blair, Holywood, all of Ireland

[73] Assignee: Short Brothers PLC, Belfast, Ireland

[21] Appl. No.: 307,722

[22] PCT Filed: Jan. 24, 1994

[86] PCT No.: PCT/GB94/00131

§ 371 Date: Oct. 24, 1994

§ 102(e) Date: Oct. 24, 1994

[87] PCT Pub. No.: WO94/16945

PCT Pub. Date: Aug. 4, 1994

[30] Foreign Application Priority Data

Jan. 26, 1993 [GB] United Kingdom ............... 9301457

[51] Int. Cl.$^6$ ........................................... B64D 29/00
[52] U.S. Cl. ......................................................... 244/54
[58] Field of Search ............................ 244/53 R, 54, 244/53 B, 129.4; 60/39.31, 226.1

[56] References Cited

U.S. PATENT DOCUMENTS

| 4,206,893 | 6/1980 | Howard | 244/54 |
|---|---|---|---|
| 4,361,296 | 11/1982 | Hall et al. | 244/54 |

FOREIGN PATENT DOCUMENTS

| 0361901 | 4/1990 | European Pat. Off. |
| 2291091 | 11/1976 | France |
| 717760 | 11/1954 | United Kingdom |
| 750623 | 6/1956 | United Kingdom |
| 850691 | 10/1960 | United Kingdom |
| 883634 | 12/1961 | United Kingdom |
| 950909 | 2/1964 | United Kingdom |
| 1077196 | 7/1967 | United Kingdom |
| 1120240 | 7/1968 | United Kingdom |
| 1244181 | 8/1971 | United Kingdom |
| 1375868 | 11/1974 | United Kingdom |
| 1520759 | 8/1978 | United Kingdom |

OTHER PUBLICATIONS

PCT Search Report (copy filed w/original application) Search Report, UK App. GB 9401269.7..
"Aircraft Gas Turbine Engine Technology", 1979, McGraw-Hill Book Company Publication by Irwin E. Treager, P. 340, Fig. 18–14.

*Primary Examiner*—Galen L. Barefoot
*Attorney, Agent, or Firm*—Lyon & Lyon

[57] ABSTRACT

An aircraft propulsive power unit (19) comprises a nacelle structure (20) housing an engine and having a forward nacelle portion (21) and a rearward nacelle portion (131). The rearward end of the forward nacelle portion (21) in an operational position adjoins the forward end of the rearward nacelle portion (131) and the forward end of the forward nacelle portion (21) includes an intake opening leading to an intake barrel (28) upstream of the engine for the supply of intake air to the engine. The forward nacelle portion (21) has an uninterrupted or substantially uninterrupted low drag exterior surface thereover and the power unit includes support structure to support the forward nacelle portion (21) while permitting it to be moved forwardly on the support structure from the operational position to a forward position in which it is supported by the support structure forwardly of the operational position to provide access to components of the power unit (19) which are inaccessible with the forward nacelle portion (21) in the operational position.

24 Claims, 5 Drawing Sheets

AIRCRAFT PROPULSIVE POWER UNIT

The present invention relates to propulsive power units for aircraft and is particularly although not exclusively concerned with a power unit comprising a ducted fan turbine (turbofan) engine and a nacelle which houses the engine.

The function of the nacelle for a turbofan engine is generally twofold. Firstly, the nacelle must provide an air intake flow to the fan of minimal disturbance for a variety of flight conditions which include high incidence, gusts and the like. Secondly, the exterior profile of the nacelle should be such as to minimise aerodynamic drag, subject to constraints imposed by major engine components such as the accessories gearbox.

Considering the exterior profile, the skin friction component of the overall profile drag is directly affected by the discontinuities on the outer surface. While the ideal would be for a smooth, uninterrupted outer surface, this ideal is compromised in nacelles hitherto proposed by the various breaks in the outer skin which arise due to the doors and panels required to gain access to the equipment housed within.

Figure 1:
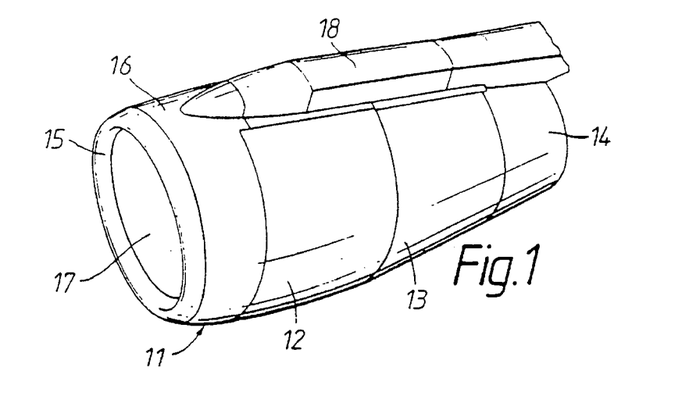
FIG. 1 is a schematic perspective view (hereinbefore referred to) of a typical conventional underwing pylon mounted turbofan power unit including a nacelle structure as hitherto proposed

A typical conventional nacelle is shown in FIG. 1 of the drawings, which is a schematic perspective view of an underwing pylon mounted turbofan power unit. The main structural components of the nacelle are the inlet cowl 11, the fan cowl doors 12, the thrust reverser unit 13 and the nozzle 14. The inlet cowl 11 is a single unit, comprising a leading edge lipskin structure 15, an outer main skin 16, an air intake acoustic barrel 17 which serves to attenuate engine noise, and various internal stiffening members and bulkheads. The inlet cowl 11 generally attaches, via a flange at the rear of the acoustic barrel 17, to a front flange of the engine fan case. The fan cowl doors 12 are generally hinged at the pylon 18, and are latched together at the bottom centre line. The thrust reverser unit 13 may take a variety of forms but is typically mounted on the pylon 18. The nozzle 14 may be attached in a variety of ways depending upon the exhaust philosophy adopted, i.e., mixed or separate fan stream exhaust and core exhaust. The forms which the thrust reverser and nozzle take only marginally affect the benefits derived from a propulsive power unit according to the present invention and as hereinafter to be described, as will become apparent.

Aerodynamic research has demonstrated that on such conventional nacelle structures as illustrated in FIG. 1 the gap between the inlet cowl and the fan cowl doors is a source of nacelle drag.

In addition to the fan cowl doors, various other inspection doors and removable panels (not shown) are provided in the exterior skin 16 of the inlet cowl 11 of the nacelle shown in FIG. 1 in order to gain access to equipment housed within the cowl 11. The presence of joints occurring between the main exterior cowl skin and such inspection doors and removable panels still further reduces the aerodynamic efficiency of the exterior surface of the nacelle.

It is an object of the present invention to provide an aircraft propulsion power unit in which access to equipment housed within the nacelle can be gained without the use of access panels and doors as provided in nacelles hitherto proposed.

According to the present invention there is provided an aircraft propulsive power unit comprising an engine, a nacelle structure housing the engine and having a forward nacelle portion and a rearward nacelle portion, the rearward end of the forward nacelle portion in an operational position of the forward nacelle portion adjoining the forward end of the rearward nacelle portion and the forward end of the forward nacelle portion including an intake opening leading to an intake barrel upstream of the engine for the supply of intake air to the engine characterised in that the unit includes support means to support the forward nacelle portion while permitting it to be moved on the support means from the operational position to a forward position in which it is supported by the support means forwardly of the operational position to provide access to components of the power unit which are inaccessible with the forward nacelle portion in the operational position.

In a preferred embodiment of the invention the forward nacelle portion has an uninterrupted or substantially uninterrupted low drag exterior surface thereover.

By "uninterrupted or substantially uninterrupted" is meant that no intrusion or breaks are present in the exterior surface of the forward nacelle portion or that the intrusion or breaks which are present are limited to those arising from a small number of access panels which may be needed for the purpose of engine serviceability between flights.

In a preferred embodiment of the invention hereinafter to be described the support means is such as to provide for translational movement of the forward nacelle portion from its operational position to its forward position.

According to a first aspect of the invention hereinafter to be described the engine is a turbofan engine including a ducted fan installation enclosed by a fan case which is inaccessible with the forward nacelle portion in the operational position and to which access is gained by movement of the forward nacelle portion on the support means to the forward position.

The invention accordingly removes the need to provide fan cowl doors of the conventional nacelle as shown in FIG. 1 and the aerodynamic drag is thus reduced by eliminating the circumferential forward outer skin break between the inlet cowl and the fan cowl doors, as well as the longitudinal outer skin break between the fan cowl doors at the bottom centre line of the nacelle.

According to a second aspect of the present invention the intake barrel is secured to a forward end of the engine, the forward nacelle portion includes a leading edge profile formed by a lipskin structure at the forward end thereof which has rearwardly extending outer and inner lipskin edge portions, the forward nacelle portion further includes an outer main skin which extends rearwardly from the outer lipskin edge portion and in the operational position of the forward nacelle portion the inner lipskin edge portion adjoins the forward end of the intake barrel while in the forward position of the forward nacelle portion it is spaced forwardly of the intake barrel to reveal the inner surface of the rearwardly extending outer main skin and to give access thereto and to components mounted thereon.

The need for inspection doors and removable panels to gain access to components in the interior of the forward nacelle portion is accordingly removed and the aerodynamic efficiency of the nacelle structure thereby improved.

In a preferred embodiment of the invention hereinafter to be described the first and second aspects of the invention are both embodied in a turbofan propulsive power unit.

In the preferred embodiment of the invention hereinafter to be described the rearward end of the forward nacelle portion terminates at a position downstream of the fan case. Where the engine includes a thrust reverser unit rearward of the fan installation the rearward end of the forward nacelle portion in its operational position terminates at the forward extent of the thrust reverser unit.

In an embodiment of the invention hereinafter to be described the inner lipskin edge portion of the leading edge profile of the forward nacelle portion in its operational position extends rearwardly into abutting relation with the forward end of the intake barrel and locating means are provided releasably to locate the inner lipskin edge portion in abutting relation to the forward end of the intake barrel. Additionally the rearward end of the forward nacelle portion when the latter is moved into the operational position abuts the forward end of the rearward nacelle portion and securing means are provided to secure it in the operational position.

In the embodiment of the invention hereinafter to be described the support means comprises a plurality of guide assemblies each of which comprises first and second interengaging guide members. One of the members of each assembly is fixed in relation to the rearward nacelle portion and the other is carried by and fixed in relation to the forward nacelle portion and the members so engage with each other as to provide support for the forward nacelle portion in its movement from the operational position to its forward position and to support it in the forward position.

In the embodiment of the invention hereinafter to be described the first guide member of each guide assembly is an elongate track element extending longitudinally of the unit and the second of the guide members is a guide element engaging in the track element for translational movement therealong. The guide element or each guide element of one or more of the guide assemblies is of elongate form and engages within the track element for translational movement therealong.

In the preferred embodiment of the invention hereinafter to be described at least one of the guide assemblies is provided with a rack and pinion drive assembly in which rotation of a pinion of the assembly imparts translational movement of the guide element within the track element.

In the embodiment of the invention hereinafter to be described two of the guide assemblies are arranged in positions spaced apart within a supporting structure which supports the unit. A further guide assembly is provided on the port side of the intake barrel and supported thereby and another is provided on the starboard side of the barrel and supported thereby.

One embodiment of the invention will now be described by way of example with reference to the accompanying drawings in which.

Figure 2:
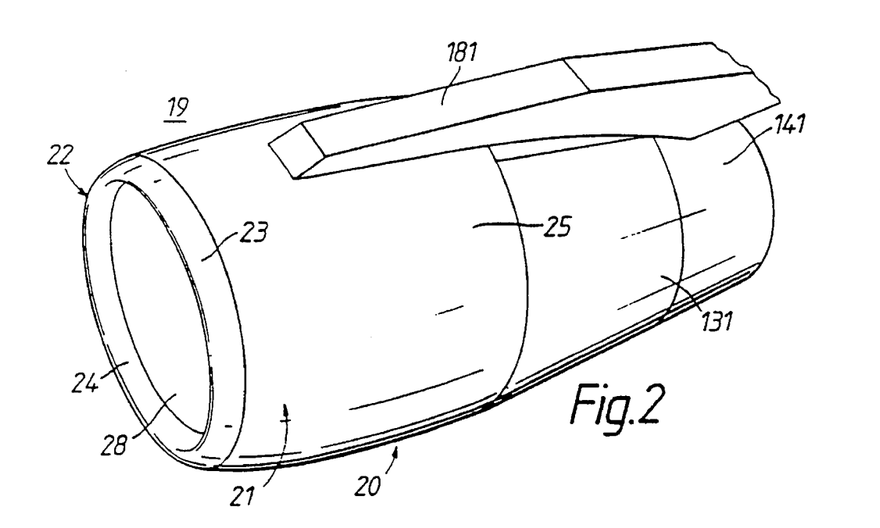
FIG. 2 is a schematic perspective view of an underwing pylon mounted turbofan power unit including a nacelle structure according to the invention

Referring now to FIG. 2 of the drawings, a power unit 19 is shown supported by a pylon 181 underwing mounted on an aircraft for which the power unit 19 provides propulsive power. The power unit 19 includes a turbofan engine (not shown) enclosed in a nacelle structure 20 which includes a forward nacelle portion 21, a thrust reverser portion 131 and a nozzle portion 141. The forward nacelle portion 21 includes a leading edge 22 formed by a lipskin structure having rearwardly extending outer and inner lipskin edges 23 and 24 and an outer main skin 25 which extends rearwardly from the outer lipskin edge 23 and which terminates at its junction with the forward end of the thrust reverser unit 131.

Figure 3A:
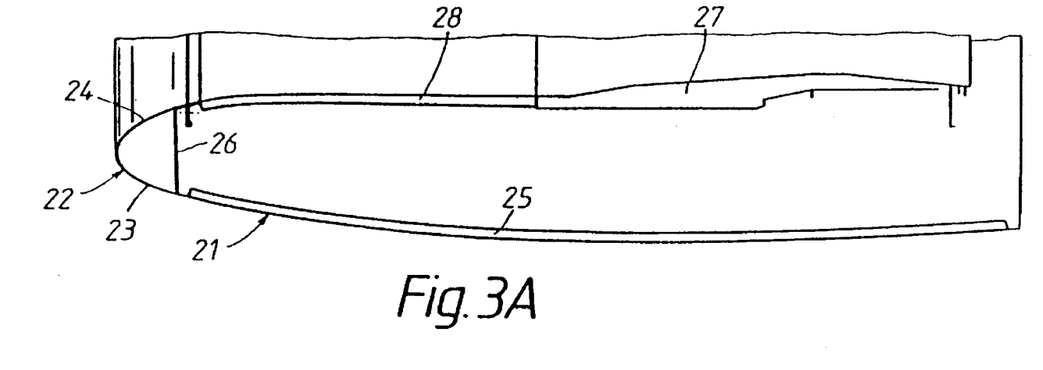
FIG. 3A is a schematic scrap section of the nacelle structure shown in FIG. 2 showing a forward nacelle portion of the structure in its operational position

Referring now to FIG. 3A, a scrap vertical section is shown of a lower forward part of the power unit 19 shown in FIG. 2. It reveals the forward nacelle portion 21 with its leading edge 22 formed by the outer and inner lipskin edges 23 and 24, a forward bulkhead 26 and the outer main skin 25. Also shown is a scrap section of a fan case 27 of a fan installation of the turbofan engine housed within the nacelle structure and a scrap section of an acoustic barrel 28 mounted on the forward end of the fan case 27.

The forward nacelle portion 21' is shown in FIG. 3A in its operational position in which the rear end of the outer main skin 25 engages the forward end of the thrust reverser unit 131 and the rearwardly extending inner lipskin edge 24 engages the forward end of the intake acoustic barrel 28. With the forward nacelle portion 21 in the operational position shown in FIG. 3A the internal and external profiles of the nacelle structure follow those shown in FIG. 2 and correspond also to the profiles found in the conventional nacelle structure shown in FIG. 1. It will however be seen that the outer main skin 25 is uninterrupted throughout its rearward extent with the first break in the nacelle exterior profile occurring at the junction between the rear end of the outer main skin 25 and the forward end of the thrust reverser unit 131.

Figure 3B:
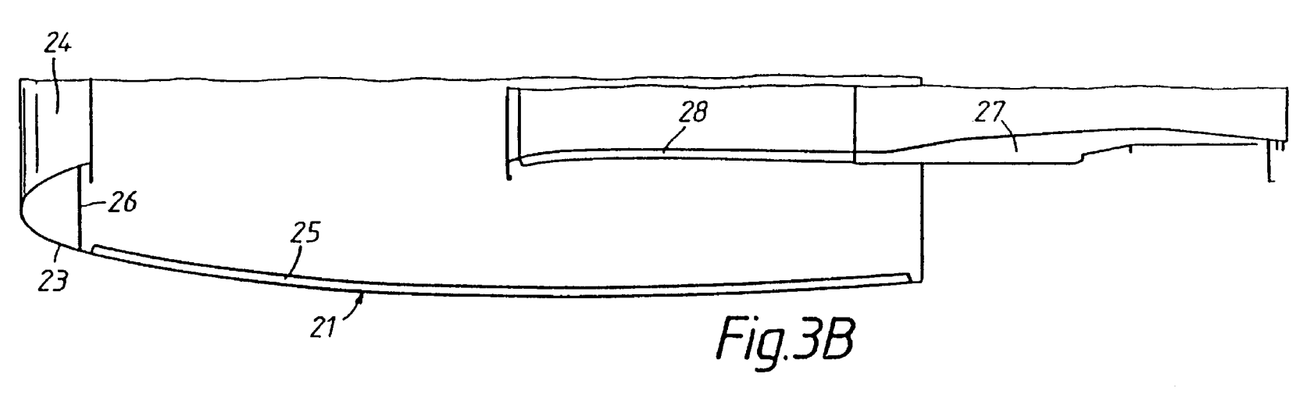
FIG. 3B is a schematic scrap section of the nacelle structure shown in FIG. 2 with the forward nacelle portion in a forward position in which it gives access to components and equipment within the nacelle structure

To gain access to the fan case 27 and equipment carried on the interior surface of the outer main skin 25 of the nacelle portion 21 and within the leading edge 22, the forward nacelle portion 21 is, in accordance with the invention, movable forwardly with respect to the other parts of the power unit 19 including the fan case 27 and acoustic barrel 28 to a forward position as illustrated in FIG. 3B. As will be seen from FIG. 3B the fan case 27 is revealed as well as the interior of the outer main skin 25 and the leading edge 22 giving access to these components and the equipment carried by them.

By so arranging for forward movement of the forward nacelle portion 21 as described with reference to FIGS. 3A and 3B, access can be gained to components and equipment which have required for access in conventional nacelle structures fan cowl doors as well as other inspection panels and doors forming drag inducing breaks in the exterior profile of the nacelle structure.

It will be appreciated that it is essential to provide for proper location of the forward nacelle portion 21 with respect to the forward end of the acoustic barrel 28 when the forward nacelle portion 21 is moved into its operational position as shown in FIG. 2 and FIG. 3A. For this purpose, there is provided a plurality of locating pin assemblies arranged in spaced relation around the circumference of the leading edge 22, which will now be described with reference to FIGS. 4A and 4B.

Figure 4A:
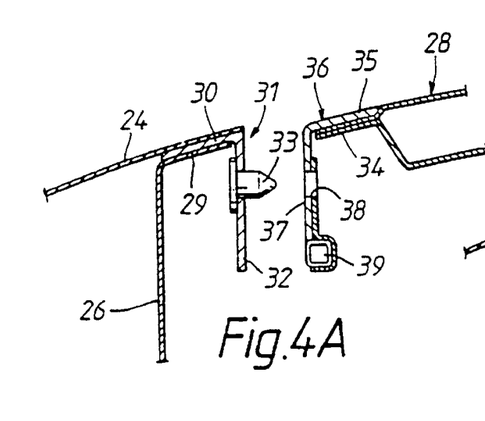
FIG. 4A is a scrap view showing a locating mechanism for locating the forward end of the forward nacelle portion of the nacelle structure illustrated in FIG. 2 in relation to the forward end of an intake barrel of the power unit
Figure 4B:
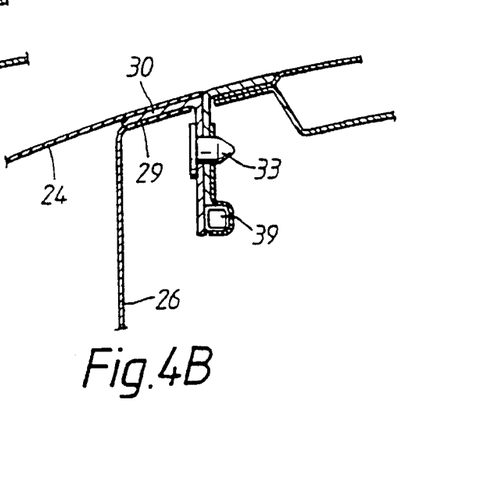
FIG. 4 is a view corresponding to that of FIG. 4A and illustrating the forward end of the forward nacelle portion in abutting engagement with the forward end of the intake barrel of the power unit and with the locating mechanism engaged

As will be seen from FIG. 4A the inner lipskin edge 24 of the leading edge 22 of the forward nacelle portion 21 extends rearwardly over a rearwardly extending circumferential flange 29 carried by the bulkhead 26. Interposed between and secured to the end of the inner lipskin edge 24 and the flange 29 is a circumferentially extending portion 30 of an end plate 31 having an annular radially extending face portion 32 which carries a plurality of locating pins 33 arranged in spaced apart relation around the annular face portion 32. The forward end of the intake barrel 28 includes a forwardly extending circumferential lip portion 34 to which is secured a flange portion 35 of a further end plate 36 which includes a radially directed annular face portion 37 formed with spaced apertures 38 corresponding in number and disposition to the pins 33 carried by the annular face portion 32. Movement of the forward nacelle portion 21 from the position shown in FIG. 4A to its operational position as shown in FIG. 4B brings the pins 33 into engagement in the openings 38. In addition, the inner edge of the annular face portion 37 is provided with a sealing ring 39 as shown.

Figure 5:
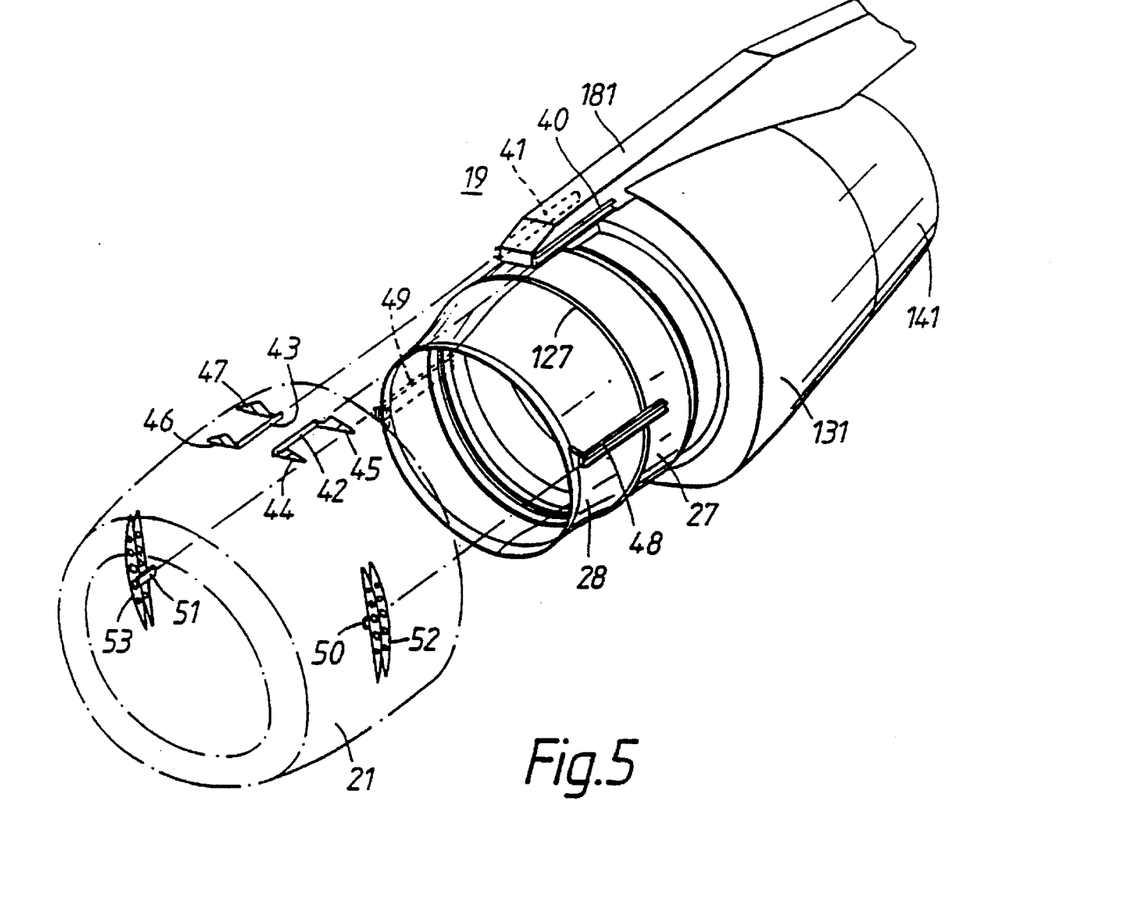
FIG. 5 is a schematic exploded perspective view of the power unit shown in FIG. 2, illustrating the guide assemblies employed for translatory movement of the forward nacelle portion of the nacelle structure shown in FIG. 2

Turning now to FIG. 5, part of the power unit 19 illustrated in FIG. 2 is shown in full line and comprises the acoustic barrel 28, the fan case 27, the thrust reverser unit 131 and the nozzle 141, with the unit 19 being supported by the pylon 181. The forward nacelle portion 21 is shown in chain dot line and in a position in which it is well forward of its forward access position in order to reveal the components which it would normally obscure.

The unit 19 shown in FIG. 5 comprises four guide assemblies each of which includes a track element and a guide element which slidably engages within the track element. Two of the guide assemblies comprise track elements 40 and 41 and guide elements 42 and 43. As will be seen, the track elements 40 and 41 are mounted within and form an integral part of the pylon structure 181, while their corresponding guide elements 42 and 43 are secured to the interior of the forward nacelle portion 21 by end supports 44,45 and 46,47.

The other two guide assemblies comprise a portside track element 48 and a starboard track element 49 which are engaged by guide blocks 50 and 51 carried on supports 52 and 53 mounted in the interior of the forward nacelle portion 21 on the port and starboard sides thereof. As will be seen the port and starboard track elements 48 and 49 are mounted at their rearmost ends on the fan case 27 and at the engine ring 127 and at their forward ends on the acoustic barrel 28.

Figure 6:
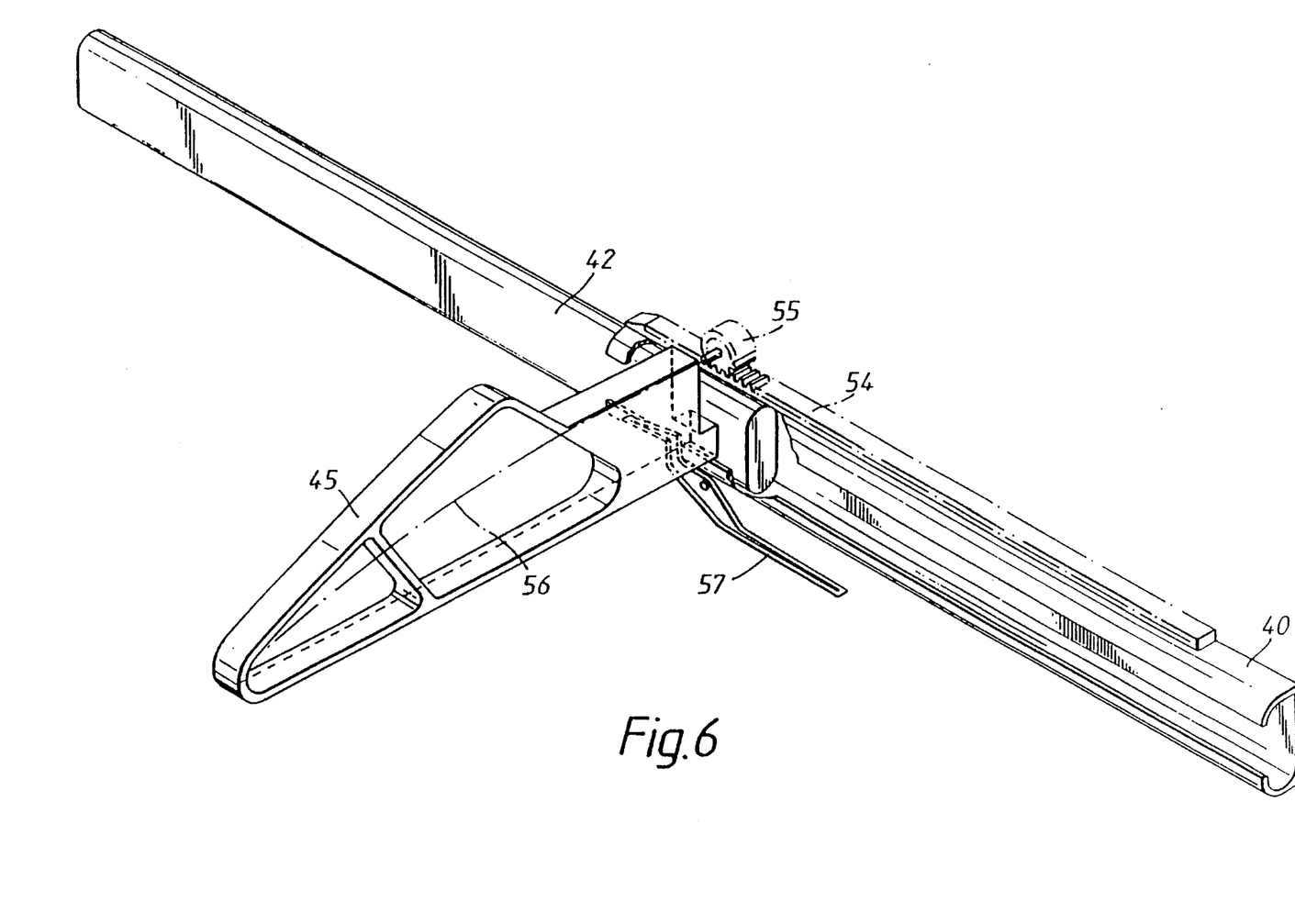
FIG. 6 is an isometric view of one of the guide assemblies shown in FIG. 5

Referring now to FIG. 6, the portside one of the upper guide assemblies mounted on the pylon structure 181 as illustrated in FIG. 5 is shown in part in FIG. 6. As will be seen, the track element 40 is of C section and is engaged by the elongate guide element 42 which is in the form of a guide bar and which is slidably engageable therewith. The rearmost bracket 45 which is secured to the interior of the forward nacelle portion 21 is shown while the forward bracket 44 which supports the remote end of the guide element 42 is not shown. The track element 40 carries a rack 54 shown in chain dot line which is engaged by a pinion 55 (also shown in chain dot line) which is carried by the bracket 45 and meshes with the rack 54 and which is rotatably driven via a flexible drive 56, which can be motor or manually driven.

In the position of the guide assembly shown in FIG. 6, the guide element 42 is fully extended with the forward nacelle portion 21 held at its forward position as illustrated in FIG. 3B. To return the forward nacelle portion 21 to the operational position illustrated in FIG. 3A, a drive is imparted to the pinion 55 which then moves along the rack 54, bringing with it the guide element 42 and the forward nacelle portion 21 to which the guide element is secured by rear bracket 45 and front bracket 44 (not shown).

The forward nacelle portion 21 is thus returned to its operational position, where the locating pins 33 carried by the bulkhead 26 at the leading edge 22 of the nacelle portion 21 engage in the openings 38 provided at the front end of the accoustic barrel 28.

As shown in FIG. 6, a mechanical stop 57 is provided to prevent the guide element 42 from leaving the forward end of the track element 40. Where the forward nacelle portion 21 requires complete removal from the power unit 19 the mechanical stop 57 is disengaged, leaving the nacelle free to move forwardly and to be removed from the unit 19.

It will be appreciated that the forward nacelle portion 21 needs to be secured in its operational position and that this may be done using any one of a variety of known latching devices. A simple form of latch mechanism which can be used for holding the forward nacelle portion 21 in the operational position in which it abuts the forward end of the thrust reverser unit 131 is illustrated schematically in FIG. 7 which is an exploded isometric view showing the component parts of the latch mechanism and will now be briefly described.

Figure 7:
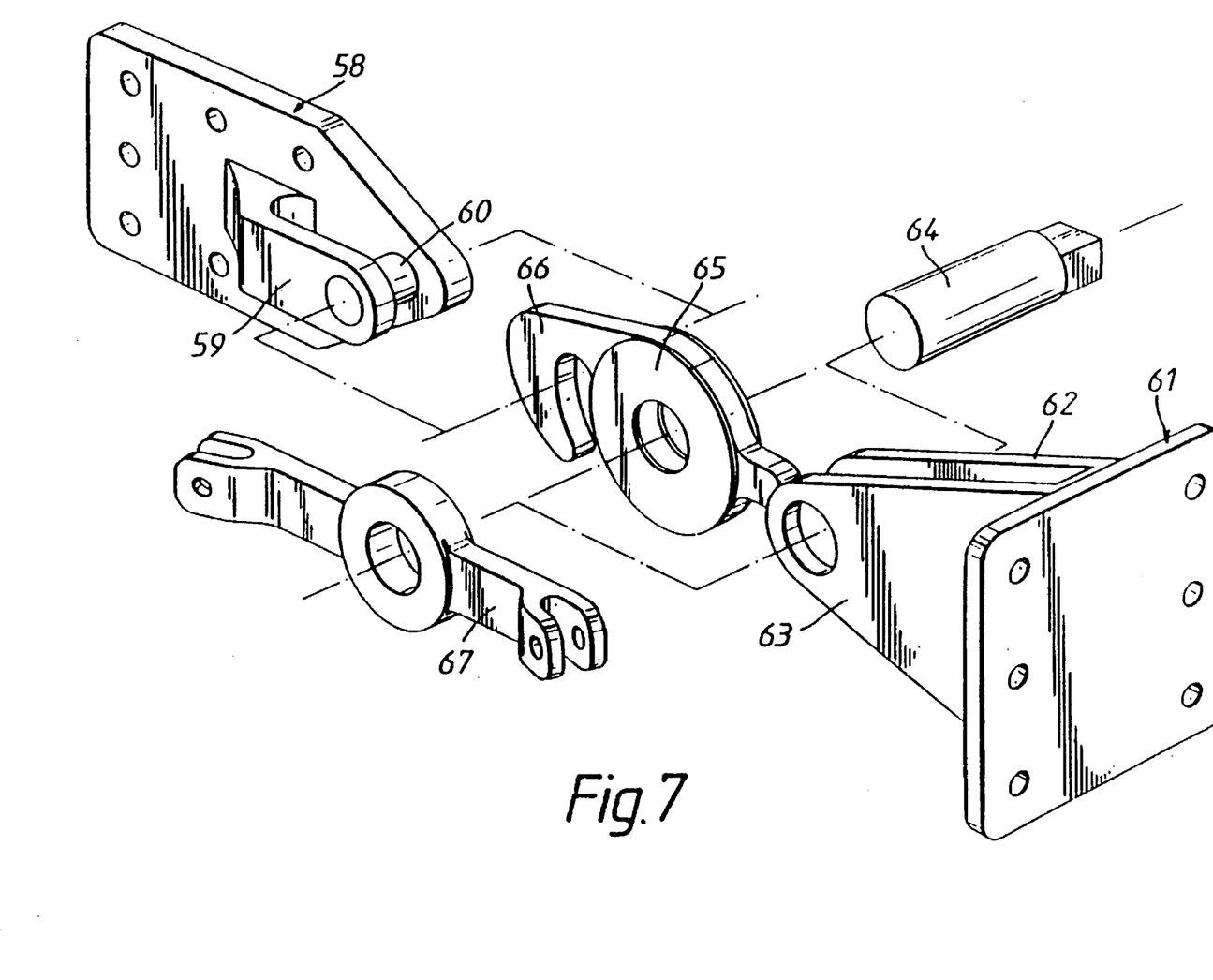
FIG. 7 is a schematic exploded isometric view of a latch mechanism for use in securing the rearward end of the forward nacelle portion of the nacelle structure shown in FIG. 2

As shown in FIG. 7, a forward bracket 58 is secured to a load bearing part provided on the forward nacelle portion 21 at the rear thereof and has formed thereon a support arm 59 which supports one end of a captive pin 60, the other end of which is fixedly mounted in the bracket 58. A further bracket 61 having forwardly extending spaced parallel arms 62 and 63 is securely mounted on a load bearing part of the thrust reverser unit 131 at the foremost extent thereof. The arms 62 and 63 provide support for a shaft 64 which carries a latch element 65 which is pinned to the shaft 64 and located between the arms 62 and 63 of the bracket 61. The latch element 65 is provided as shown with a forwardly extending hooked end portion 66. A manually operable lever 67 also pinned to the shaft 64 is provided for rotating the shaft 64 for engagement and release of the latch element 65 and the arrangement is such that during the final movement of the forward nacelle portion 21 into its operational position in which it moves into abutting relation with the thrust reverser unit 131 the hooked end portion 66 rides up and over the captive pin 60 on the bracket 58 and then is turned counter clockwise as viewed in FIG. 7 by means of the lever 67 to bring the end of the hooked end portion 66 behind the pin 60. The latch mechanism is released by turning the lever 67 in a clockwise direction. A plurality of such latch mechanism as shown in FIG. 7 may be arranged at spaced positions around the forward end of the thrust reverser unit 131.

While the present invention offers benefits to nacelle aerodynamics in general, it is anticipated that the concept will find particular application to laminar flow nacelles where the elimination of skin breaks is of fundamental importance. Such nacelles include both natural laminar flow control and hybrid laminar flow control, that is to say, a combination of a modified exterior profile and boundary layer suction.

A further benefit of the present invention is the comprehensive access which is provided by translating the forward nacelle portion 21 forward, thereby revealing both fan case mounted engine systems and intake mounted accessories. With a hybrid laminar flow control nacelle, the significantly improved access provided by translating the forward nacelle portion 21 forward, by comparison with conventional nacelles, permits ready access to the flow control systems which will typically be housed below the outer skin of the nacelle. Such systems include the flow compartmentation, ducting, pumps and control instrumentation.

It should be noted that for the purposes of engine serviceability between flights, there may a requirement for a small number of access panels. The intention is that these intrusions are limited and that where applicable they are located as far aft as possible within the contraints of the engine design in terms of systems layout.

We claim:

1. An aircraft propulsive power unit comprising an engine, a nacelle structure housing the engine and having a forward nacelle portion and a rearward nacelle portions the rearward end of the forward nacelle portion in an operational position of the forward nacelle portion adjoining the forward end of the rearward nacelle portion and the forward end of the forward nacelle portion including an intake opening leading to an intake barrel upstream of the engine for the supply of intake air to the engine, the unit including support means to support the forward nacelle portion while permitting it to be moved on the support means from the operational position to a forward position in which it is supported by the support means forwardly of the operational position to provide access to components of the power unit which are inaccessible with the forward nacelle portion in the operational position, the engine being a turbofan engine including a ducted fan installation enclosed by a fan case which is inaccessible with the forward nacelle portion in the operational position and to which access is gained by movement of the forward nacelle portion on the support means to the forward position.

2. A unit according to claim 1, wherein the forward nacelle portion has an uninterrupted or a substantially uninterrupted low drag exterior surface.

3. A unit according to claim 1, wherein the support means is such as to provide for translational movement of the forward nacelle portion from its operational position to its forward position.

4. A unit according to claim 2, wherein the engine is a turbofan engine including a ducted fan installation enclosed by a fan case which is inaccessible with the forward nacelle portion in the operational position and to which access is gained by movement of the forward nacelle portion on the support means to the forward position.

5. A unit according to claim 1 wherein the intake barrel is secured to a forward end of the fan case, wherein the forward nacelle portion includes a leading edge profile formed by lipskin structure at the forward end thereof which has rearwardly extending outer and inner lipskin edge portions, wherein the forward nacelle portion further includes an outer main skin portion which extends rearwardly from the outer lipskin edge portion and wherein the inner lipskin edge portion in the operational position of the forward nacelle portion adjoins the forward end of the intake barrel and in the forward position of the forward nacelle portion is spaced forwardly of the intake barrel to reveal the inner surface of the rearwardly extending outer main skin and to give access thereto and to components mounted thereon.

6. A unit according to claim 1, wherein the intake barrel is secured to a forward component of the engine, wherein the forward nacelle portion includes a leading edge profile formed by lipskin structure at the forward end thereof which has rearwardly extending outer and inner lipskin edge portions, wherein the forward nacelle portion further includes an outer main skin which extends rearwardly from the outer lipskin edge portion and wherein the inner lipskin edge portion in the operational position of the forward nacelle portion adjoins the forward end of the intake barrel and in the forward position of the forward nacelle portion is spaced forwardly of the intake barrel to reveal the inner surface of the rearwardly extending outer main skin and to give access thereto and to components mounted thereon.

7. A unit according to claim 6 wherein the engine is a turbofan engine including a ducted fan installation enclosed by a fan case which is inaccessible with the forward nacelle portion in the operational position and access to the fan case is also gained by movement of the forward nacelle portion to the forward position.

8. A unit according to claim 1, wherein the rearward end of the forward nacelle portion terminates at a position downstream of the fan case.

9. A unit according to claim 5, wherein the inner lipskin edge portion of the leading edge profile of the forward nacelle portion in the operational position of the forward nacelle portion extends rearwardly into abutting relation with the forward end of the intake barrel and wherein locating means are provided releasably to locate the inner lipskin edge portion in abutting relation to the forward end of the intake barrel.

10. A unit according to claim 5, wherein the rearward end of the forward nacelle portion when the latter is moved into the operational position abuts the forward end of the rearward nacelle portion and wherein securing means are provided to secure it in the operational position.

11. A unit according to claim 1, wherein the support means comprises one or more guide assemblies of first and second interengaging guide members, wherein one of the members is fixed in relation to the rearward nacelle portion and the other is carried by and fixed in relation to the forward nacelle portion and wherein the members of the or each assembly so engage with each other as to provide support for the forward nacelle portion in its movement from the operational position to its forward position and to support it in the forward position.

12. A unit according to claim 11 wherein a plurality of guide assemblies are provided and wherein the first guide members are a plurality of elongate track elements extending longitudinally of the unit and the second guide members are a plurality of guide elements engaging in the track elements for translational movement therealong.

13. A unit according to claim 12 wherein the or each guide element of one or more of the guide assemblies is of elongate form and engages within the track element for translational movement therealong.

14. A unit according to claim 12 wherein at least one of the guide assemblies is provided with a rack and pinion drive assembly in which rotation of a pinion of the assembly imparts translational movement of the guide element within the track element.

15. A unit according to any of claims 12, wherein two of the guide assemblies are arranged in positions spaced apart within a supporting structure which supports the unit.

16. A unit according to claim 15 for underwing mounting on an aircraft wherein the supporting structure comprises a wing mounted pylon member.

17. A unit according to claim 12 wherein one of the plurality guide assemblies is provided on the port side of the intake barrel and supported thereby and another is provided on the starboard side of the barrel and supported thereby.

18. A unit according to claim 1, wherein the engine includes a thrust reverser unit rearward of the fan installation and wherein the rearward end of the forward nacelle portion in the operational position of the forward nacelle portion terminates at the forward extent of the thrust reverser unit.

19. An aircraft propulsive power unit comprising an engine, a nacelle structure housing the engine and having a forward nacelle portion and a rearward nacelle portion, and support means to support the nacelle structure while permitting relative movement between the forward and rearward nacelle portions, wherein the support means supports the forward nacelle portion while permitting translational movement of the forward nacelle portion forwardly on the support means from an operational position in which the rearward and of the forward nacelle portion adjoins the forward end of the rearward nacelle portion to a forward position in which the forward nacelle portion is supported by the support means forwardly of the operational position, wherein the forward end of the forward nacelle portion includes an intake opening leading to an intake barrel which is upstream of the engine for the supply of intake air to the engine and secured to a forward component of the engine, wherein the forward nacelle portion includes a leading edge profile at the forward end thereof formed by a lipskin structure which has rearwardly extending outer and inner lipskin edge portions, wherein the forward nacelle portion further includes an outer main skin which extends rearwardly from the outer lipskin edge portion, and further wherein the inner lipskin edge portion in the operational position of the forward nacelle portion adjoins the forward end of the intake barrel and in the forward position of the forward nacelle portion is spaced forwardly of the intake barrel to reveal the inner surface of the rearwardly extending outer main skin and to give access thereto and to components mounted thereon which are inaccessible with the forward nacelle portion in the operational position.

20. A unit according to claim 19, the inner lipskin edge portion of the leading edge profile of the forward nacelle portion in the operational position of the forward nacelle portion extending rearwardly into abutting relation with the forward end of the intake barrel and locating means being provided releasably to locate the inner lipskin edge portion in abutting relation to the forward end of the intake barrel.

21. A unit according to claim 19, the rearward end of the forward nacelle portion when the latter is moved into the operational position abutting the forward end of the rearward nacelle portion and securing means being provided to secure it in the operational position.

22. A unit according to claim 19, the support means including one or more guide assemblies of first and second interengaging guide members, one of the members being fixed in relation to the rearward nacelle portion and the other being carried by and fixed in relation to the forward nacelle portion and the members of the one or more guide assemblies so engage with each other as to provide support for the forward nacelle portion in its movement from the operational position to its forward position and to support it in the forward position.

23. A unit according to claim 4, the rearward end of the forward nacelle portion terminating at a position downstream of the fan case.

24. An aircraft propulsive power unit comprising an engine, a nacelle structure housing the engine and having a forward nacelle portion and a rearward nacelle portion, the rearward end of the forward nacelle portion in an operational position of the forward nacelle portion adjoining the forward end of the rearward nacelle portion and the forward end of the forward nacelle portion including an intake opening leading to an intake barrel upstream of the engine for the supply of intake air to the engine, the unit including support means to support the forward nacelle portion while permitting it to be moved on the support means from the operational position to a forward position in which it is supported by the support means forwardly of the operational position to provide access to components of the power unit which are inaccessible with the forward nacelle portion in the operational position, the intake barrel being secured to a forward component of the engine, the forward nacelle portion including a leading edge profile formed by lipskin structure at the forward end thereof which has rearwardly extending outer and inner lipskin edge portions, the forward nacelle portion further including an outer main skin which extends rearwardly from the outer lipskin edge portion and the inner lipskin edge portion in the operational position of the forward nacelle portion adjoining the forward end of the intake barrel and in the forward position of the forward nacelle portion being spaced forwardly of the intake barrel to reveal the inner surface of the rearwardly extending outer main skin and to give access thereto and to components mounted thereon, the engine being a turbofan engine including a ducted fan installation enclosed by a fan case which is inaccessible with the forward nacelle portion in the operational position and access to the fan case being also gained by movement of the forward nacelle portion to the forward position.

\* \* \* \* \*

UNITED STATES PATENT AND TRADEMARK OFFICE
CERTIFICATE OF CORRECTION

PATENT NO. : 5,609,313
DATED : March 11, 1997
INVENTOR(S) : Cole et al.

It is certified that error appears in the above-indentified patent and that said Letters Patent is hereby corrected as shown below:

In claim 1, line 3 (col. 7, l. 22), delete "portions" and insert therefor -- portion,-- .

In claim 4, line 1 (col. 7, l. 48), delete "2" and insert therefor -- 20 --.

Signed and Sealed this

First Day of July, 1997

Attest:

BRUCE LEHMAN

Attesting Officer

Commissioner of Patents and Trademarks